United States Patent
Fukuda et al.

(10) Patent No.: US 6,414,062 B1
(45) Date of Patent: Jul. 2, 2002

(54) FLUORINATED CURABLE COMPOSITIONS

(75) Inventors: Kenichi Fukuda; Hiromasa Yamaguchi; Masatoshi Arai, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/654,609

(22) Filed: Sep. 1, 2000

(30) Foreign Application Priority Data

Sep. 3, 1999 (JP) .......................................... 11-250880

(51) Int. Cl.⁷ ........................................... C08K 5/5419
(52) U.S. Cl. ....................... 524/267; 524/261; 525/478; 525/479; 528/15; 528/25; 528/31; 528/42
(58) Field of Search ................................. 525/478, 479, 525/25; 528/15, 31, 42; 524/261, 267

(56) References Cited

U.S. PATENT DOCUMENTS

| 4,689,384 A |   | 8/1987 | Kiyohiro et al. |
| 4,771,119 A |   | 9/1988 | Wrobel |
| 5,484,868 A |   | 1/1996 | Kobayashi |
| 6,040,400 A | * | 3/2000 | Fukuda et al. |

FOREIGN PATENT DOCUMENTS

| EP | 0 254 153 | 1/1988 |
| EP | 0 665 270 | 8/1995 |
| EP | 0 978 526 | 2/2000 |
| JP | 56-143241 | 11/1981 |
| JP | 62-3959 | 1/1987 |
| JP | 63-33475 | 2/1988 |
| JP | 63-35655 | 2/1988 |
| JP | 11-116685 | 4/1999 |

OTHER PUBLICATIONS

Chem. Abs. 102:168404 &JP 59 219366 (Dec. 10, 1984).
English Abstract of JP 56–143241.
English Abstract of JP 62–35655.
English Abstract of JP 63–35655.
English Abstract of JP 11–116685.

* cited by examiner

*Primary Examiner*—Robert Dawson
*Assistant Examiner*—Marc S. Zimmer
(74) *Attorney, Agent, or Firm*—Millen, White, Zelano & Branigan, P.C.

(57) ABSTRACT

A fluorinated curable composition contains as main components, (A) a linear polyfluoro compound of the formula (1):

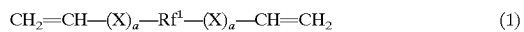

$$CH_2=CH-(X)_a-Rf^1-(X)_a-CH=CH_2 \quad (1)$$

wherein X is $-CH_2-$, $-CH_2O-$, etc., $Rf^1$ is a divalent perfluoroalkylene or perfluorooxyalkylene group, and "a" is 0 or 1, (B) a linear polyfluoro compound of the formula (2):

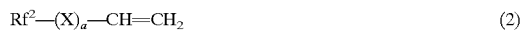

$$Rf^2-(X)_a-CH=CH_2 \quad (2)$$

wherein X and "a" are as defined above, and $Rf^2$ is a monovalent perfluoroalkyl or perfluorooxyalkyl group, (C) an organosilicon compound having at least two hydrosilyl groups, (D) a platinum group catalyst, and (E) a fluorinated organopolysiloxane. The composition is vacuum deaeratable and foam breakable, cures into a gel having improved chemical and solvent resistance, and is suited for the potting, sealing and coating of electric and electronic parts.

23 Claims, No Drawings

FLUORINATED CURABLE COMPOSITIONS

This invention relates to fluorinated curable compositions which are effectively vacuum deaeratable and foam breakable, cure into gel products having improved chemical and solvent resistance, and are suited for the potting, sealing and coating of electric and electronic parts.

BACKGROUND OF THE INVENTION

Cured gel products of silicone rubber have good electrically and thermally insulating properties, stable electric properties and flexibility. They are useful as potting and sealing compounds for electric and electronic parts, and coating compounds for protecting control circuit devices such as power transistors, ICs and capacitors from external, thermal and mechanical damages.

Typical silicone rubber composition examples forming such cured gel products are organopolysiloxane compositions of the addition curing type. The organopolysiloxane compositions of the addition curing type are known, for example, from JP-A 56-143241, 62-3959, 63-35655 and 63-33475 as comprising an organopolysiloxane having a vinyl group attached to a silicon atom and an organohydrogenpolysiloxane having a hydrogen atom attached to a silicon atom, wherein crosslinking reaction takes place in the presence of a platinum group catalyst to form a silicone gel.

However, silicon gels resulting from such organopolysiloxane compositions of the addition curing type are prone to degradation or swelling upon exposure to such chemicals as strong bases and strong acids or such solvents as toluene, alcohols and gasoline, often failing to maintain their performance.

As one solution to this problem, JP-A 11-116685 discloses a fluorochemical gel composition comprising a polyfluoro compound having two alkenyl groups and a divalent perfluoroalkylene or perfluorooxyalkylene group in a molecule, an organohydrogenpolysiloxane having a hydrogen atom attached to a silicon atom, and a platinum group catalyst as well as a fluorochemical gel product resulting from curing thereof. This cured fluorochemical gel product exhibits better chemical and solvent resistance as desired than ordinary silicone gels. However, there is a drawback that when the potting compound is fed around an electric or electronic part and kept in vacuum for removing air therefrom, it can spill over the electric or electronic part package due to foaming.

SUMMARY OF THE INVENTION

An object of the invention is to provide a fluorinated curable composition which is effectively vacuum deaeratable and foam breakable and cures into a gel product having improved chemical and solvent resistance.

It has been found that by using a linear polyfluoro compound having at least two alkenyl groups of the following general formula (1) and another linear polyfluoro compound having one alkenyl group of the following general formula (2) as base components and formulating therewith an organosilicon compound having at least two hydrosilyl groups in a molecule, a platinum group catalyst, and a fluorinated organopolysiloxane, there is obtained a fluorinated curable composition which is effectively vacuum deaeratable and foam breakable and cures into a gel product having improved chemical and solvent resistance.

Specifically, the invention provides a fluorinated curable composition comprising as main components, (A) a linear polyfluoro compound of the following general formula (1):

$$CH_2{=}CH{-}(X)_a{-}Rf^1{-}(X)_a{-}CH{=}CH_2 \qquad (1)$$

wherein X is independently $-CH_2-$, $-CH_2O-$, $-CH_2OCH_2-$ or $-Y-NR^1-CO-$ wherein Y is $-CH_2-$ or

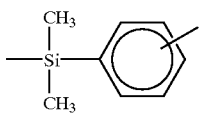

and $R^1$ is hydrogen or a substituted or unsubstituted monovalent hydrocarbon group, $Rf^1$ is a divalent perfluoroalkylene or perfluorooxyalkylene group, and "a" is independently equal to 0 or 1, (B) a linear polyfluoro compound of the following general formula (2):

$$Rf^2{-}(X)_a{-}CH{=}CH_2 \qquad (2)$$

wherein X and "a" are as defined above, and $Rf^2$ is a monovalent perfluoroalkyl or perfluorooxyalkyl group, (C) an organosilicon compound having at least two hydrosilyl groups in a molecule, (D) a platinum group catalyst, and (E) a fluorinated organopolysiloxane.

DESCRIPTION OF THE PREFERRED EMBODIMENT

In the fluorinated curable composition of the invention, component (A) is a linear polyfluoro compound of the following general formula (1).

$$CH_2{=}CH{-}(X)_a{-}Rf^1{-}(X)_a{-}CH{=}CH_2 \qquad (1)$$

Herein X is independently $-CH_2-$, $-CH_2O-$, $-CH_2OCH_2-$ or $-Y-NR^1-CO-$ wherein Y is $-CH_2-$ or

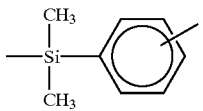

and $R^1$ is hydrogen or a substituted or unsubstituted monovalent hydrocarbon group. $Rf^1$ is a divalent perfluoroalkylene group or divalent perfluorooxyalkylene group. Letter "a" is independently equal to 0 or 1.

In formula (1), $Rf^1$ is a divalent perfluoroalkylene group or divalent perfluorooxyalkylene group. The preferred divalent perfluoroalkylene groups are of the formula: $-C_mF_{2m}-$ wherein m is an integer of 1 to 10, preferably 2 to 6. The preferred divalent perfluorooxyalkylene or

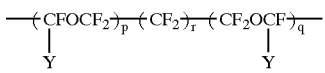

perfluoropolyether groups are of the following formulae: wherein Y is F or $CF_3$, p, q and r are integers satisfying $p \geq 1$, $q \geq 1$, $2 \leq p+q \leq 200$, especially $2 \leq p+q \leq 110$, and $0 \leq r \leq 6$;

$$-CF_2CF_2OCF_2-(CFOCF_2)_s-(CF_2)_r-(CF_2OCF)_t-CF_2OCF_2CF_2-$$
$$\phantom{-CF_2CF_2OCF_2-(}|\phantom{CFOCF_2)_s-(CF_2)_r-(CF_2OCF)_t}|$$
$$\phantom{-CF_2CF_2OCF_2-(}CF_3\phantom{CFOCF_2)_s-(CF_2)_r-(CF_2OCF)_t}CF_3$$

wherein r, s and t are integers satisfying $0 \leq r \leq 6$, $s \geq 0$, $t \geq 0$, $0 \leq s+t \leq 200$, especially $2 \leq s+t \leq 110$;

$$-CF-(OCFCF_2)_u-(OCF_2)_v-OCF-$$
$$\phantom{-C}|\phantom{-(OCFCF_2)_u-(OCF_2)_v-O}|\phantom{CF-}|$$
$$\phantom{-C}Y\phantom{-(OCFCF_2)_u-(OCF_2)_v-O}Y\phantom{CF-}Y$$

wherein Y is F or $CF_3$, u and v are integers satisfying $1 \leq u \leq 100$ and $1 \leq v \leq 50$;

$$-CF_2CF_2-(OCF_2CF_2CF_2)_w-OCF_2CF_2-$$

wherein w is an integer in the range of $1 \leq w \leq 100$.

Illustrative examples of $Rf^1$ are given below.

$$-C_4F_8-, -C_6F_{12}-,$$

$$-(CFOCF_2)_n(CF_2OCF)_{\overline{m}}- \quad \overline{n+m} = 2 \text{ to } 200,$$
$$\phantom{-(}|\phantom{FOCF_2)_n(CF_2OC}|$$
$$\phantom{-(}CF_3\phantom{FOCF_2)_n(CF_2OC}CF_3$$

$$-CF_2CF_2OCF_2(CF_2)_2CF_2OCF_2CF_2-,$$

$$-CF_2CF_2OCF_2CFOCF_2(CF_2)_2CF_2OCFCF_2OCF_2CF_2-,$$
$$\phantom{-CF_2CF_2OCF_2}|\phantom{OCF_2(CF_2)_2CF_2O}|$$
$$\phantom{-CF_2CF_2OCF_2}CF_3\phantom{OCF_2(CF_2)_2CF_2O}CF_3$$

$$-CF_2(OCF_2CF_2)_n(OCF_2)_mOCF_2-\quad \overline{n}=1\sim100, \overline{m}=1 \text{ to } 100,$$

$$-CF(OCFCF_2)_n(OCF_2)_mOCF-\quad \overline{n}=1\sim100, \overline{m}=1 \text{ to } 100,$$
$$\phantom{-C}|\phantom{(OC}|\phantom{CF_2)_n(OCF_2)_mO}|$$
$$\phantom{-C}CF_3\phantom{(}CF_3\phantom{CF_2)_n(OCF_2)_mO}CF_3$$

$$-CF_2CF_2(OCF_2CF_2CF_2)_nOCF_2CF_2-\quad \overline{n}=5 \text{ to } 100$$

In formula (1), X is independently $-CH_2-$, $-CH_2O-$, $-CH_2OCH_2-$ or $-Y-NR^1-CO-$. Herein Y is $-CH_2-$ or a group of the following formula.

$$\begin{array}{c} CH_3 \\ | \\ -Si-\phantom{x}\bigcirc \\ | \\ CH_3 \end{array}$$

$R^1$ is hydrogen or a substituted or unsubstituted monovalent hydrocarbon group. The monovalent hydrocarbon groups preferably have 1 to 12 carbon atoms, more preferably 1 to 10 carbon atoms. Illustrative are unsubstituted monovalent hydrocarbon groups, for example, alkyl groups such as methyl, ethyl, propyl, butyl, hexyl, cyclohexyl and octyl, aryl groups such as phenyl and tolyl, and aralkyl groups such as benzyl and phenylethyl, and substituted monovalent hydrocarbon groups obtained by replacing some or all of the hydrogen atoms in the foregoing groups by halogen atoms such as fluorine.

The alkenyl groups in formula (1) are preferably vinyl, allyl and analogous groups having a $-CH=CH_2$ structure at the end. The alkenyl groups may be bonded to opposite ends of the backbone directly or via divalent linkage groups represented by X.

In formula (1), letter "a" is independently equal to 0 or 1.

Component (B) is a linear polyfluoro compound of the following general formula (2).

$$Rf^2-(X)_a-CH=CH_2 \quad (2)$$

Herein X and "a" are as defined above, and $Rf^2$ is a monovalent perfluoroalkyl group or monovalent perfluorooxyalkyl group.

In formula (2), $Rf^2$ is a monovalent perfluoroalkyl group or monovalent perfluorooxyalkyl group. The preferred monovalent perfluoroalkyl groups are of the formula: $C_mF_{2m+1}-$ wherein m is an integer of 1 to 20, preferably 2 to 10. The preferred monovalent perfluorooxyalkyl or perfluoropolyether groups are of the following formulae:

$$F-(CFCF_2O)_p-CF-$$
$$\phantom{F-(}|\phantom{FCF_2O)_p-}|$$
$$\phantom{F-(}CF_3\phantom{FCF_2O)_p-}CF_3$$

wherein p is an integer of at least 1, and $$F-(CFCF_2O)_q-CFCF_2OCF_2CF_2-$$
$$\phantom{F-(}|\phantom{FCF_2O)_q-}|$$
$$\phantom{F-(}CF_3\phantom{FCF_2O)_q-}CF_3$$

wherein q is an integer of at least 1.

Illustrative examples of $Rf^2$ are given below.

$C_4F_9-$, $C_8F_{17}-$, $$F-(CFCF_2O)_n-CF-\quad \overline{n} = 2 \text{ to } 200,$$
$$\phantom{F-(}|\phantom{FCF_2O)_n-}|$$
$$\phantom{F-(}CF_3\phantom{FCF_2O)_n-}CF_3$$

$$F-(CFCF_2O)_n-CFCF_2OCF_2CF_2-\quad \overline{n} = 2 \text{ to } 200$$
$$\phantom{F-(}|\phantom{FCF_2O)_n-}|$$
$$\phantom{F-(}CF_3\phantom{FCF_2O)_n-}CF_3$$

In formula (2), X and "a" are as defined in formula (1). It is understood that X and "a" in formula (1) may be identical with or different from X and "a" in formula (2), respectively.

Like component (A), the alkenyl group in formula (2) is preferably a vinyl, allyl or analogous group having a $-CH=CH_2$ structure at the end. The alkenyl group may be bonded to the backbone directly or via a divalent linkage group represented by X.

The composition of the invention should preferably have an appropriate flow and maintain adequate physical properties upon curing in order that the composition be used in casting, potting, coating, impregnation, adhesion or tight bonding. From this standpoint, the above-described components (A) and (B) each should desirably have a viscosity of about 5 to 100,000 centipoise (cp) at 25° C. For each component, one having an optimum viscosity within this range is selected depending on a particular application.

The mixing proportion of components (A) and (B) is not critical because the proportion largely varies depending on the desired hardness of a cured product and the structure of a crosslinker. Preferably the weight ratio of components (A)/(B) ranges from 1/100 to 100/1 and more preferably from 1/50 to 50/1.

Component (C) is an organosilicon compound which serves as a crosslinker and chain extender for both the components (A) and (B). The organosilicon compound (C) is not critical as long as it has at least two hydrosilyl groups (Si—H groups) in a molecule. When the compatibility with and dispersion in components (A) and (B) and uniformity after curing are taken into account, the organosilicon compound should preferably further contain at least one monovalent perfluorooxyalkyl, monovalent perfluoroalkyl, divalent perfluorooxyalkylene or divalent perfluoroalkylene group in the molecule as well as at least two, preferably at least three hydrosilyl (Si—H) groups in the molecule. These perfluorooxyalkyl, perfluoroalkyl, perfluorooxyalkylene and perfluoroalkylene groups are as exemplified below.

monovalent perfluoroalkyl:

$C_mF_{2m+1}-$ wherein m is an integer of 1 to 20, preferably 2 to 10.

divalent perfluoroalkylene:

$-C_mF_{2m}-$ wherein m is an integer of 1 to 20, preferably 2 to 10.

monovalent perfluorooxyalkyl:

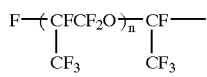

wherein n is an integer of 1 to 5.

divalent perfluorooxyalkylene:

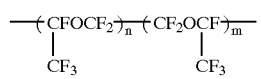

wherein an average of m+n is an integer of 2 to 100.

The organosilicon compound (C) may be either cyclic or chain-like, or even have a three-dimensional network structure. It preferably has at least one monovalent substituent attached to a silicon atom in a molecule, that is, at least one organic group containing a perfluoroalkyl, perfluoroalkyl ether or perfluoroalkylene group represented by the following general formulae.

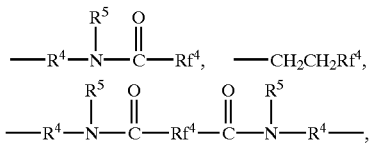

Herein, $R^4$ is a divalent hydrocarbon group preferably of 1 to 10 carbon atoms, especially 2 to 6 carbon atoms, for example, an alkylene group such as methylene, ethylene, propylene, methylethylene, tetramethylene or hexamethylene, or an arylene group such as phenylene. $R^5$ is hydrogen or a monovalent hydrocarbon group preferably of 1 to 8 carbon atoms, especially 1 to 6 carbon atoms, for example, an alkyl or aryl group. $Rf^4$ is a monovalent perfluoroalkyl or perfluorooxyalkyl group as defined for $Rf^2$ in formula (2). $Rf^5$ is a divalent perfluoroalkylene or perfluorooxyalkylene group as defined for $Rf^1$ in formula (1).

Other than the mono or divalent fluorinated substituents, which are monovalent organic groups containing a perfluoroalkyl, perfluorooxyalkyl, perfluoroalkylene or perfluorooxyalkylene group as mentioned just above, the organosilicon compound (C) may have a monovalent substituent attached to a silicon atom, which is preferably a monovalent hydrocarbon group free of aliphatic unsaturation and having 1 to 10 carbon atoms, especially 1 to 8 carbon atoms.

The number of silicon atoms in the organosilicon compound is not critical although it preferably has about 2 to 60 silicon atoms, more preferably about 3 to 30 silicon atoms. Illustrative examples of the organosilicon compound are given below where Me denotes methyl and Ph denotes phenyl. These organosilicon compounds may be used alone or in admixture.

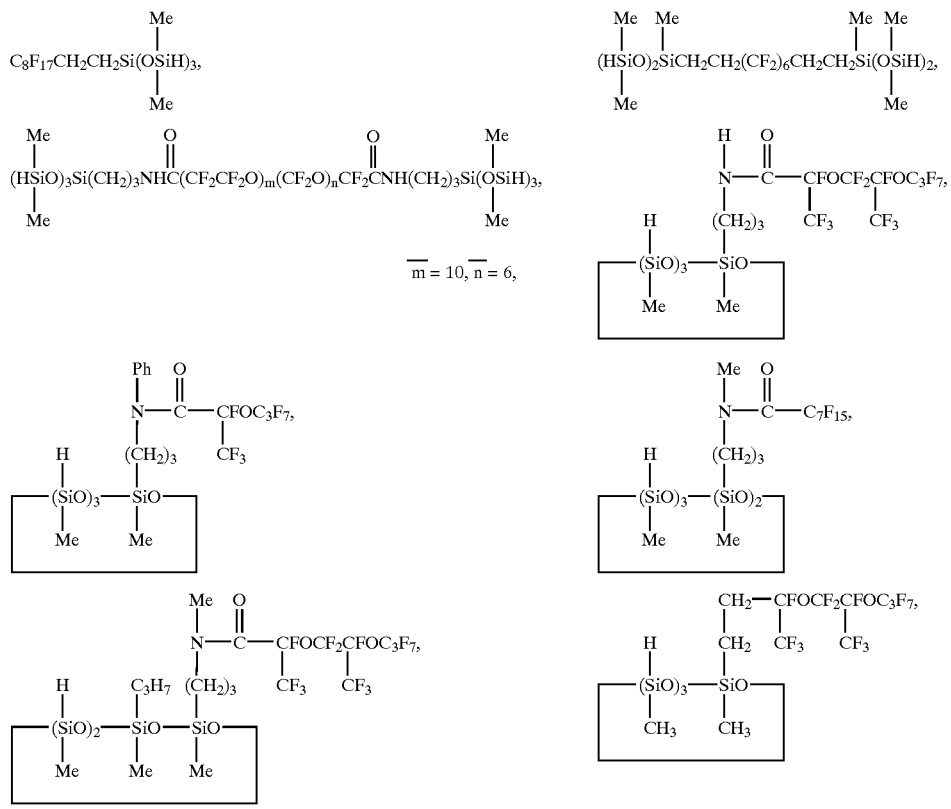

-continued
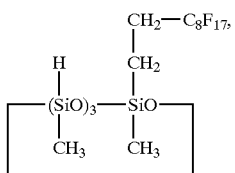
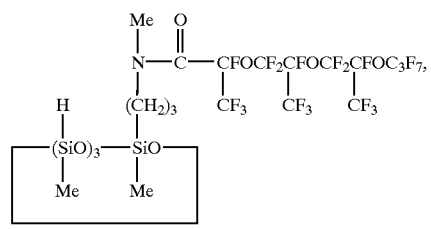
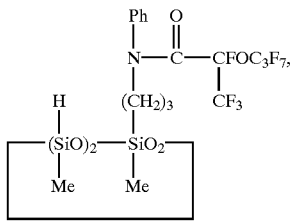
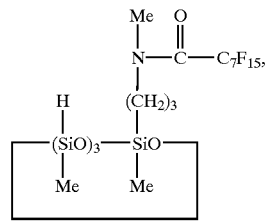
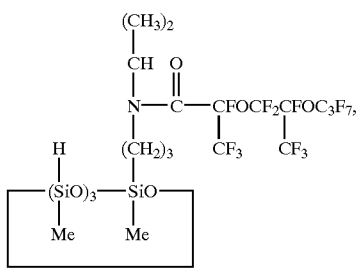
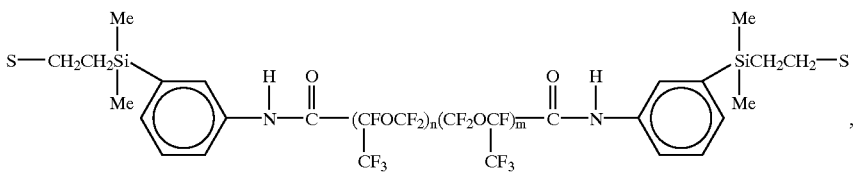
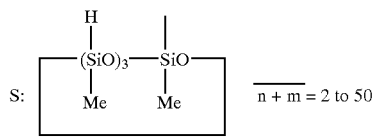
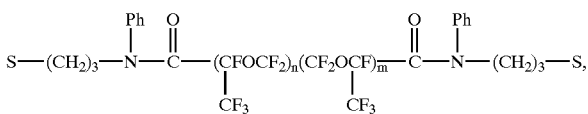
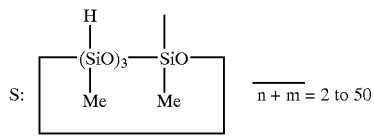
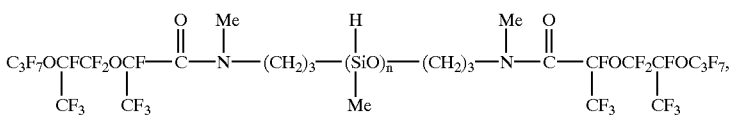

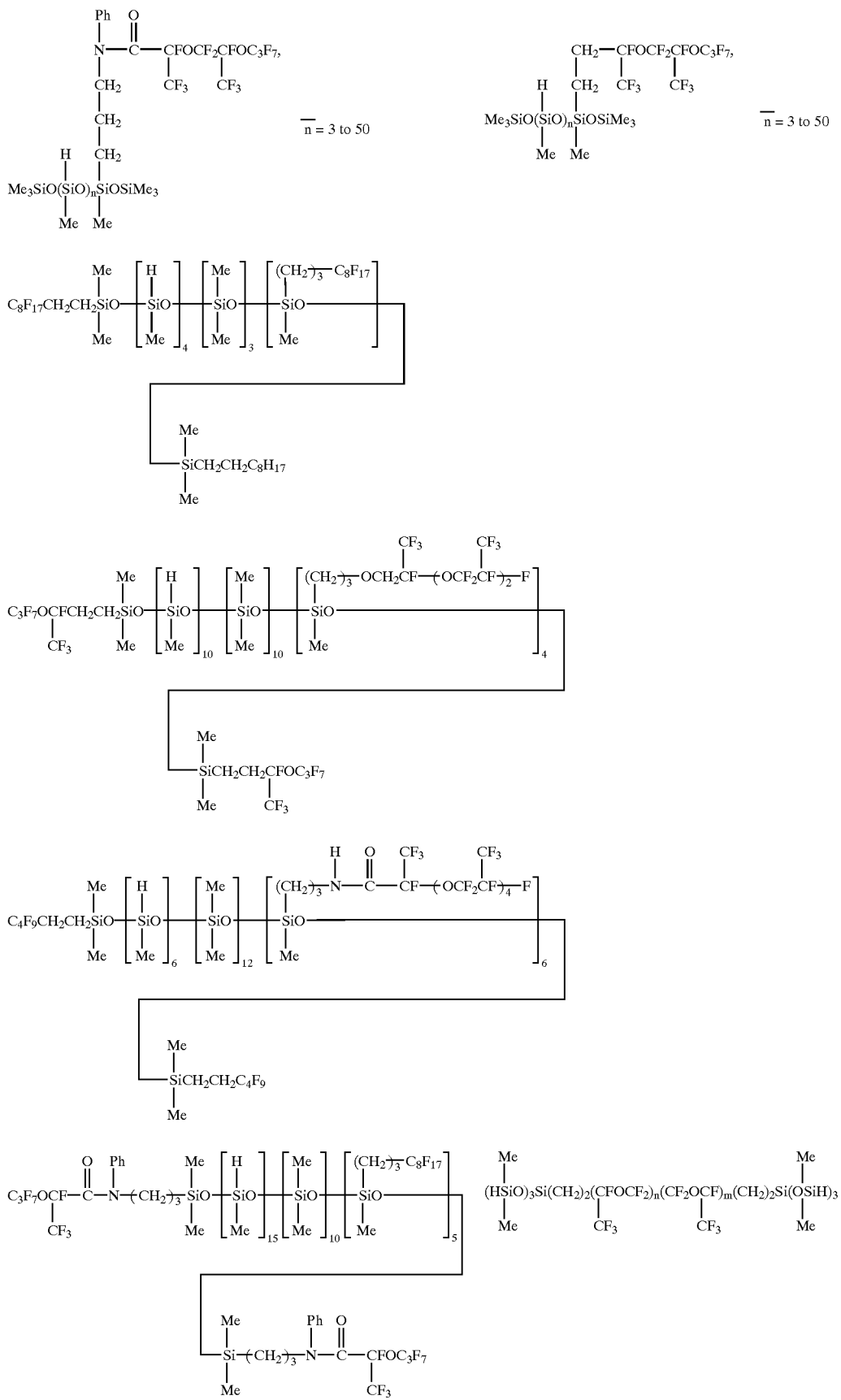

Herein, n and m each are an integer of at least 1, and n+m is from 2 to 50.

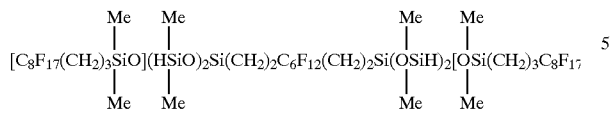

The organosilicon compound (C) is preferably blended in such amounts that 0.2 to 2 mol, more preferably 0.5 to 1.3 mol of hydrosilyl (Si—H) groups are available therefrom per mol of aliphatic unsaturated groups including vinyl, allyl, and cycloalkenyl groups in the entire composition. With amounts of the organosilicon compound giving less than 0.2 mol of Si—H groups, the objects of the invention may not be attained and the composition may not cure into a gel because of a short degree of crosslinking. Excessive amounts of the organosilicon compound giving more than 2 mol of Si—H groups may leave a risk of foaming upon curing.

Component (D) is a platinum group catalyst for promoting addition reaction between alkenyl groups in components (A) and (B) and hydrosilyl groups in component (C). These catalysts are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$.

The platinum group catalyst is used in a catalytic amount, which is preferably about 0.1 to 100 parts by weight per million parts by weight of components (A), (B) and (C) combined.

Component (E) is a fluorinated organopolysiloxane which serves as an anti-foaming agent for improving foam breakability during vacuum deaeration. This fluorinated organopolysiloxane is preferably a linear fluorinated organopolysiloxane of the following general formula (3).

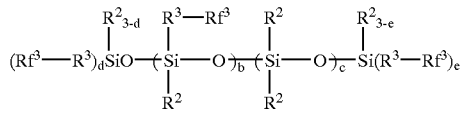

Herein $Rf^3$ is a monovalent perfluoroalkyl or perfluorooxyalkyl group of 1 to 14 carbon atoms, $R^2$ is independently a monovalent hydrocarbon group of 1 to 10 carbon atoms, $R^3$ is a divalent organic group of 2 to 5 carbon atoms, "b" and "c" each are an integer of at least 0, "d" and "e" are independently equal to 0, 1, 2 or 3, with the proviso that b, d and e are not equal to 0 at the same time.

In formula (3), $Rf^3$ is a perfluoroalkyl or perfluorooxyalkyl group of 1 to 14 carbon atoms, preferably 4 to 10 carbon atoms. Where two or more $Rf^3$ groups are included in the molecule, they may be the same or different. The preferred perfluoroalkyl groups are straight or branched ones of the formula: $C_kF_{2k+1}$— wherein k is an integer of 1 to 14. The preferred perfluorooxyalkyl groups are straight or branches ones of the following formulae.

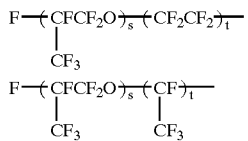

Herein, s is an integer of 1 to 4, and t is equal to 0 or 1.

In formula (3), $R^2$ is independently selected from monovalent hydrocarbon groups of 1 to 10 carbon atoms, especially 1 to 8 carbon atoms. Preferred monovalent hydrocarbon groups are alkyl or aryl groups, especially methyl or phenyl.

In formula (3), $R^3$ is selected from divalent organic groups of 2 to 5 carbon atoms, as typified by alkylene groups of 2 to 5 carbon atoms. The alkylene groups may have at an intermediate or ends of their carbon atom chain an ether bond or an amide bond which may be unsubstituted or substituted with a $C_{1-6}$, especially $C_{1-3}$ lower alkyl or phenyl. Typical examples of such alkylene groups include —$CH_2CH_2$—, —$CH_2CH_2CH_2$—, —$(CH_2)_4$—, —$(CH_2)_5$—, —$CH_2OCH_2CH_2CH_2$—, —$CH(CH_3)$—, —$CH(CH_3)CH_2$—, —$CONHCH_2CH_2CH_2$—, —$CON(CH_3)CH_2CH_2CH_2$—, and —$CON(C_6H_5)CH_2CH_2CH_2$—. Where two or more $R^3$ groups are included in a molecule, they may be the same or different.

In formula (3), "b" and "c" each are an integer inclusive of 0, preferably b+c is 1 to 100, especially 2 to 60, "d" and "e" are independently equal to 0, 1, 2 or 3, with the proviso that b, d and e are not equal to 0 at the same time. It is desirable that b to d are selected such that the content of fluorine in the molecule is at least 10% by weight calculated as fluorine atoms. The fluorinated organopolysiloxane preferably has a viscosity of about 1 to 300 centistokes at 25° C.

Typical, non-limiting, examples of the fluorinated group-bearing organopolysiloxane are given below.

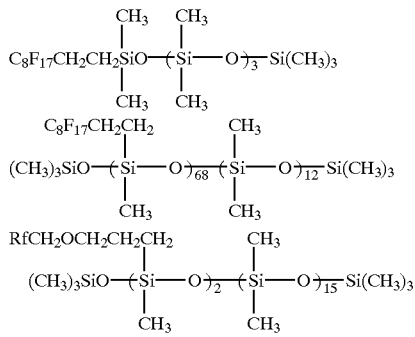
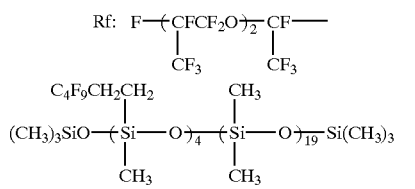
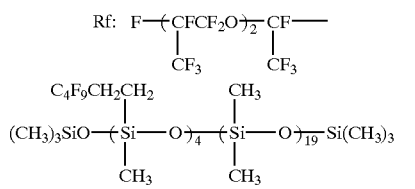

In the practice of the invention, component (E) should desirably have a low surface tension to components (A) and (B), specifically a surface tension of up to 30 dyn/cm, and more desirably up to 20 dyn/cm. The fluorinated organopolysiloxane having such a low surface tension (E) is effective for breaking foams. Namely, when foams evolve, component (E) having a low surface tension diffuses between an air layer and component (A) or (B) so that component (E) becomes foam-breaking nuclei.

The fluorinated group-bearing organopolysiloxane of formula (3) can be prepared by well-known methods.

Preferably the fluorinated organopolysiloxane (E) is blended in amounts of about 0.001 to 1 part, more preferably about 0.005 to 0.5 part, and most preferably about 0.005 to 0.05 part by weight per 100 parts by weight of linear polyfluoro compounds (A) and (B) combined. Less than 0.001 part of component (E) will not fully exert an antifoaming effect. More than 1 part of component (E) may achieve no further effect and lose compatibility with components (A), (B) and (C).

In addition to the above-described components (A) to (E), the composition of the invention may further contain various additives which are per se known. Such optional components include regulators for hydrosilylation catalysts, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, 3-methyl-3-penten-1-yne, 3,5-dimethyl-3-hexen-1-yne, etc., polymethylvinylsiloxane cyclic compounds, and organic phosphorus compounds. These regulators are effective for maintaining curing reactivity and storage stability appropriate. Other optical components include inorganic fillers, for example, fumed silica, silica aerogel, precipitated silica, ground silica, diatomaceous earth, iron oxide, zinc oxide, titanium oxide, calcium carbonate, magnesium carbonate, zinc carbonate, and carbon black. By adding such inorganic fillers to the inventive composition, the hardness and mechanical strength of cured gel can be adjusted. There may be added hollow inorganic fillers, hollow organic fillers and rubbery spherical fillers as well. The amounts of these optional components added are arbitrary insofar as they do not compromise the physical properties of cured gel.

The fluorinated curable composition comprising the essential and optional components mentioned above is cured into a gel product (or cured gel) having improved solvent resistance and chemical resistance.

By the term "cured gel" as used herein it is meant that the cured product has a three-dimensional structure in part and undergoes deformation and flow under stress. As an approximate measure, the cured gel has a hardness of up to "0" as measured by a JIS rubber hardness meter or a penetration of 1 to 200 as measured according to ASTM D-1403 (¼ cone).

The cured gel is generally obtained by well-known methods, for example, by pouring the inventive composition of the addition curing type into a suitable mold and causing the composition to cure therein. Alternatively, the inventive composition is coated onto a suitable substrate and cured thereon. Curing is readily effected by heating at a temperature of about 60 to 150° C. for about 30 to 180 minutes.

There have been described fluorinated curable compositions which are effectively vacuum deaeratable and foam breakable, and yield cured gel products having improved chemical and solvent resistance. The compositions are thus suited for the potting and sealing of electric and electronic parts and as protective coating materials for control circuit elements such as power transistors, ICs and capacitors.

EXAMPLE

Examples of the invention are given below by way of illustration and not by way of limitation. Parts are by weight.

Example 1

To 50 parts of a polymer (viscosity 3,000 cp) of the following formula (4) and 50 parts of a polymer (viscosity 1,000 cp) of the following formula (5) were added 0.01 part of a compound of the following formula (6), 13.7 parts of a compound of the following formula (7), 0.15 part of a 50% toluene solution of ethynylcyclohexanol, and 0.015 part of an ethanol solution of a vinylsiloxane complex with chloroplatinic acid (platinum concentration 3.0% by weight). Mixing these components yielded a fluorinated curable composition.

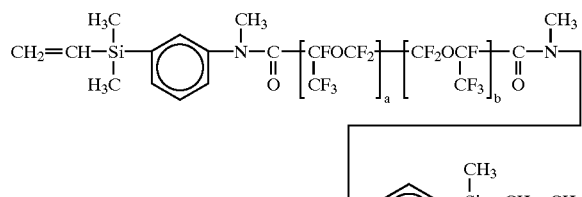

$$\overline{a + b} = 35$$

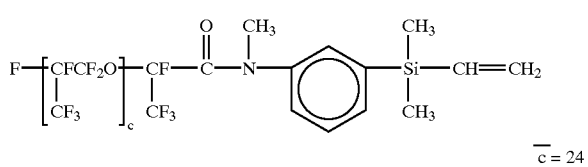

$$\overline{c} = 24$$

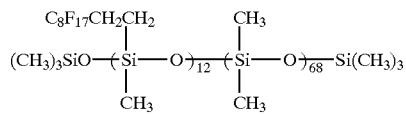

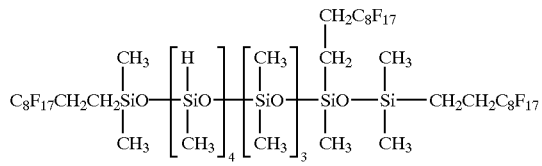

The composition was cured by heating at 150° C. for one hour, obtaining a clear cured gel having a penetration of 78 as measured according to ASTM D-1403 (¼ cone).

Example 2

A fluorinated curable composition was prepared as in Example I except that 0.03 part of a compound of the following formula (8) was used instead of the compound of formula (6) and 12.1 parts of a compound of the following formula (9) was used instead of the compound of formula (7).

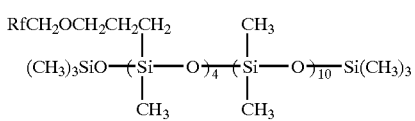

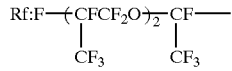

-continued

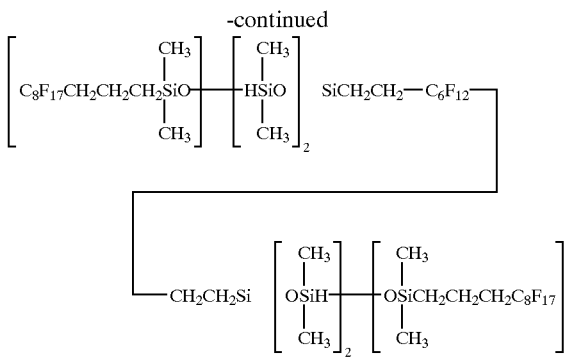

The composition was cured as in Example 1, obtaining a clear cured gel having a penetration of 65.

Comparative Example 1

A similar composition was prepared as in Example 1 except that the compound of formula (6) was omitted. The composition was cured as in Example 1, obtaining a clear cured gel having a penetration of 78.

Comparative Example 2

A similar composition was prepared as in Example 2 except that the compound of formula (8) was omitted. The composition was cured as in Example 1, obtaining a clear cured gel having a penetration of 65.

Next, the above compositions were examined for antifoaming property. Each of the four compositions, 20 ml, was admitted into a 100-ml test tube, which was shaken for one minute for foaming. After shaking, evacuation was made to a vacuum of 1 Torr. The height of foams upon foaming and the time passed until the complete extinction of foams were measured.

TABLE 1

|  | E1 | E2 | CE1 | CE2 |
|---|---|---|---|---|
| Foaming height (cm) | 1 | 1 | 15 | 20 |
| Foam extinction time (min) | 0.5 | 0.5 | 10 | 15 |

Japanese Patent Application No. 11-250880 is incorporated herein by reference.

Reasonable modifications and variations are possible from the foregoing disclosure without departing from either the spirit or scope of the present invention as defined by the claims.

What is claimed is:
1. A fluorinated curable Composition comprising as main components,

(A) a linear polyfluoro compound of the following general formula (1):

$$CH_2=CH-(X)_a-Rf^1-(X)_a-CH=CH_2 \quad (1)$$

wherein X is independently —CH$_2$—, —CH$_2$O—, —CH$_2$OCH$_2$— or —Y—NR$^1$—CO— wherein Y is —CH$_2$— or

and R$^1$ is hydrogen or a substituted or unsubstituted monovalent hydrocarbon group, Rf$^1$ is a divalent perfluoroalkylene or perfluorooxyalkylene group, and "a" is independently equal to 0 or 1, (B) a linear polyfluoro compound of the following general formula (2):

$$Rf^2-(X)_a-CH=CH_2 \quad (2)$$

wherein X and "a" are as defined above, and Rf$^2$ is a monovalent perfluoroalkyl or perfluorooxyalkyl group, (C) an organosilicon compound having at least two hydrosilyl groups in a molecule,
(D) a platinum group catalyst, and
(E) a fluorinated organopolysiloxane of the following general formula (3);

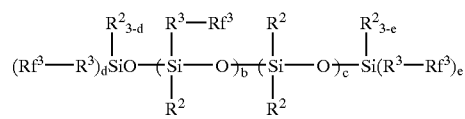

wherein Rf$^3$ is a monovalent perfluoroalkyl or perfluorooxyalkyl group of 1 to 14 carbon atoms, R$^2$ is independently a monovalent hydrocarbon group of 1 to 10 carbon atoms, R$^3$ is a divalent organic group of 2 to 5 carbon atoms, "b" and "c" each are an integer of at least 0, "d" and "e" are independently equal to 0, 1, 2 or 3, with the proviso that b, d and e are not equal to 0 at the same time.

2. The fluorinated curable composition of claim 1 which cures into a gel product having a penetration of 1 to 200 as measured according to ASTM D-1403.

3. A composition according to claim 1, wherein 0.001 to 1 part by weight of the fluorinated organopolysiloxane (E) is blended per 100 parts by weight of components (A) and (B) combined.

4. A composition according to claim 1, wherein Rf$^1$ is selected from one of the formulas:

(a) —C$_m$F$_{2m}$— wherein m is 1 to 10;

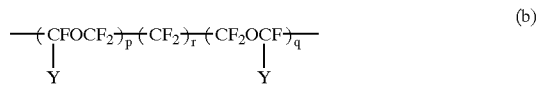

wherein Y is F or CF$_3$, p, q and r are each integers in which p is ≧1, q≧1, 2≦p+q≦200, and 0≦r≦6;

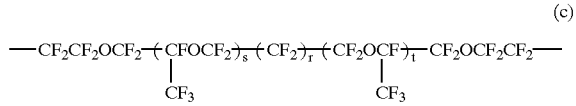

wherein r, s and t are integers satisfying 0≦r≦6, s≧0, t≧0, 0≦s+t≦200;

(d)

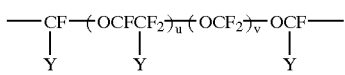

wherein Y is F or $CF_3$, and u and v are integers satisfying $1 \leq u \leq 100$ and $1 \leq v \leq 50$; and (e) $-CF_2CF_2-(OCF_2CF_2CF_2)_w-OCF_2CF_2-$
wherein w is an integer in the range of $1 \leq w \leq 100$.

5. A composition according to claim 1, wherein $R^1$ is a monovalent hydrocarbon group having 1–12 carbon atoms which is optionally substituted by halogen atoms.

6. A composition according to claim 5, wherein $R^1$ is methyl, ethyl, propyl, butyl, hexyl, cyclohexyl, octyl, phenyl, tolyl, benzyl, or phenylethyl, in each case optionally substituted by fluorine.

7. A composition according to claim 1, wherein $Rf^2$ is selected from the formulas:

(a) $C_mF_{2m+1}-$ wherein m is 1 to 20;

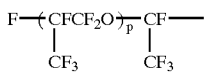

(b)

wherein p is an integer of at least 1; and

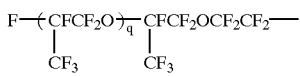

wherein q is an integer of at least one.

8. A composition according to claim 1, wherein components (A) and (B) are in a weight ratio of 1/100 to 100/1.

9. A composition according to claim 8, wherein components (A) and (B) are in a weight ratio of 1150 to 50/1.

10. A composition according to claim 1, wherein the organosilicon compound of component C contains at least one monovalent perfluorooxyalkyl, monovalent perfluoroalkyl, divalent perfluorooxyalkylene or divalent perfluoroalkylene group.

11. A composition according to claim 1, wherein the organosilicon compound of component C contains at least three hydrosilyl (Si—H) groups.

12. A composition according to claim 1, wherein the organosilicon compound of component C contains 2 to 60 silicon atoms.

13. A composition according to claim 12, wherein the organosilicon compound of component C contains 3 to 30 silicon atoms.

14. A composition according to claim 1, wherein the organosilicon compound of component (C) is present in an amount whereby there are 0.2 to 2 mol of hydrosilyl (Si—H) groups per mol of aliphatic unsaturated groups within the overall composition.

15. A composition according to claim 1, wherein the catalyst of component D is chloroplatinic acid; a complex of chloroplatinic acid with an olefin; a complex of chloroplatinic acid with an alcohol and vinylsiloxanes; platinum on silica, alumina or carbon; $RhCl(PPh_3)_3$; $RhCl(CO)(PPh_3)_2$; $Ru_3(CO)_{12}$; $IrCl(CO)(PPh_3)_2$; or $Pd(PPh_3)_4$.

16. A composition according to claim 1, wherein the amount of the platinum group catalyst is 0.1 to 100 parts by weight per million parts by weight of components (A), (B) and (C) combined.

17. A composition according to claim 2, wherein $Rf^3$ is of the formula $C_kF_{2k+1}-$ wherein k is 1–14, or is of the following formulas

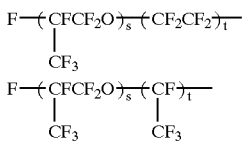

when s in an integer of 1 to 4, and t is 0 or 1.

18. A composition according to claim 2, wherein $R^2$ is methyl or phenyl.

19. A composition according to claim 2, wherein $R^3$ is an alkylene group optionally having ether bonds or amide bonds wherein the amide bonds are unsubstituted or substituted with a $C_{1-6}$ alkyl or phenyl.

20. A composition according to claim 20, wherein $R^3$ is $-CH_2CH_2-$, $-CH_2CH_2CH_2-$, $-(CH_2)_4-$, $-(CH_2)_5-$, $-CH_2OCH_2CH_2CH_2-$, $-CH(CH_3)-$, $-CH(CH_3)CH_2-$, $-CONHCH_2CH_2CH_2-$, $-CON(CH_3)CH_2CH_2CH_2-$, or $-CON(C_6H_5)CH_2CH_2CH_2-$.

21. A composition according to claim 2, wherein b+c is 1 to 100.

22. A composition according to claim 1, wherein the amount of fluorinated organopolysiloxane (E) is 0.005 to 0.5 part per 100 parts by weight of components (A) and (B) combined.

23. A fluorinated curable composition comprising as main components, (A) a linear polyfluoro compound of the following general formula (1):

wherein X is independently $-CH_2-$, $-CH_2O-$, $-CH_2OCH_2-$ or

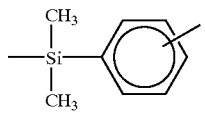

$-Y-NR^1-CO-$ wherein Y is $-CH_2-$ or
and $R^1$ is hydrogen or a substituted or unsubstituted monovalent hydrocarbon group, $Rf^1$ is a divalent perfluoroalkylene or perfluorooxyalkylene group, and "a" is independently equal to 0 or 1, (B) a linear polyfluoro compound of the following general formula (2).

wherein X and "a" are as defined above, and $Rf^2$ is a monovalent perfluoroalkyl or perfluorooxyalkyl group, (C) an organosilicon compound having at least two hydrosilyl groups in a molecule wherein said organosilicon compound functions as a crosslinker and chain extender for both components (A) and (B);

(D) a platinum group catalyst, and (E) a fluorinated organopolysiloxane.

* * * * *